United States Patent
Niemioja

(10) Patent No.: US 12,049,063 B2
(45) Date of Patent: Jul. 30, 2024

(54) METHOD AND APPARATUS FOR LAMINATING GLASS SHEETS

(71) Applicant: Glaston Finland Oy, Tampere (FI)

(72) Inventor: Jussi Niemioja, Tampere (FI)

(73) Assignee: GLASTON FINLAND OY, Tampere (FI)

(*) Notice: Subject to any disclaimer, the term of this patent is extended or adjusted under 35 U.S.C. 154(b) by 0 days.

(21) Appl. No.: 18/299,365

(22) Filed: Apr. 12, 2023

(65) Prior Publication Data

US 2023/0241868 A1    Aug. 3, 2023

Related U.S. Application Data

(62) Division of application No. 17/474,654, filed on Sep. 14, 2021, now Pat. No. 11,938,702.

(30) Foreign Application Priority Data

Sep. 15, 2020    (FI) ...................................... 20205886

(51) Int. Cl.
   *B32B 17/10*    (2006.01)
   *B32B 37/06*    (2006.01)

(52) U.S. Cl.
   CPC .. *B32B 17/10871* (2013.01); *B32B 17/10036* (2013.01); *B32B 17/10862* (2013.01); *B32B 37/06* (2013.01); *B32B 2315/08* (2013.01)

(58) Field of Classification Search
   CPC ........ B32B 17/10036; B32B 17/10862; B32B 17/10871; B32B 17/10972;
   (Continued)

(56) References Cited

U.S. PATENT DOCUMENTS 2,163,648 A    6/1939    Watkins et al.
5,536,347 A    7/1996    Moran
(Continued)

FOREIGN PATENT DOCUMENTS

EP    0 707 950 A2    4/1996
EP    2 431 172 A1    3/2012
(Continued)

OTHER PUBLICATIONS

The European Search Report issued Feb. 10, 2022, by the European Patent Office in corresponding European Patent Application No. 21192422.0-1107. (4 pages).
(Continued)

*Primary Examiner* — Philip C Tucker
*Assistant Examiner* — Jimmy R Smith, Jr.
(74) *Attorney, Agent, or Firm* — Boone IP Law, PLLC

(57) ABSTRACT

A method for laminating glass sheets is disclosed. A sandwich structure sheet moving in a heating furnace on rollers is heated by two-sided hot air blasting which is carried out by several successive blowing aperture sections, and, to reduce or prevent the formation of air bubbles in finished laminated glass, the heating of the rear end of the sandwich structure sheet is prevented by cutting off the hot air blasting of at least one blowing aperture section when the rear edge of the sandwich structure sheet approaches the blowing aperture section. An apparatus for laminating glass sheets is also disclosed, comprising a heating furnace, a pair of press rolls and means for establishing location data on the sandwich structure sheet. The heating furnace is provided with a roller track, a blower, a heating resistor, an air distribution conduit, and several successive blowing boxes with closing means.

7 Claims, 5 Drawing Sheets

(58) Field of Classification Search
CPC ........ B32B 2309/02; B32B 2310/0454; B32B 2315/08; B32B 37/003; B32B 37/06
See application file for complete search history.

(56) References Cited

U.S. PATENT DOCUMENTS

| | | |
|---|---|---|
| 8,097,107 B2 | 1/2012 | Morgan et al. |
| 2014/0216641 A1 | 8/2014 | Canfield |
| 2022/0315471 A1* | 10/2022 | Vehmas ................ C03B 27/012 |

FOREIGN PATENT DOCUMENTS

| | | |
|---|---|---|
| EP | 2 805 926 A1 | 11/2014 |
| FI | 100009 B | 8/1997 |
| FI | 118003 B | 5/2007 |
| WO | 8803517 A1 | 5/1988 |
| WO | 03/057478 A1 | 7/2003 |

OTHER PUBLICATIONS

Finnish Search Report issued on Feb. 17, 2021, by the Finnish Patent Office in corresponding Finnish Patent Application No. 20205886. (2 pages).

* cited by examiner

METHOD AND APPARATUS FOR LAMINATING GLASS SHEETS

CROSS-REFERENCE TO RELATED APPLICATIONS

This application is a divisional application of U.S. patent application Ser. No. 17/474,654, filed on Sep. 14, 2021, which claims priority to Finnish Patent Application No. 20205886, filed on Sep. 15, 2020, the entire contents of which are incorporated herein by reference for all purposes.

FIELD

The present disclosure relates to a method and an apparatus for laminating glass sheets.

BACKGROUND

Glass is laminated to reinforce the glass, to improve its safety in use or to provide different coatings or tinting. In the lamination process, a plastic film is disposed between two glass sheets. The plastic film is, for example, polyvinyl butyral (PVB), ethyl vinyl acetate (EVA) or SentryGlas™. The most common plastic film thicknesses are 0.38, 0.76 and 1.52 mm. The assembly is heated, which results in the plastic film softening and strongly adhering to the glass sheets by means of chemical bonds. The plastic film is heated in a lamination furnace to the target temperature, whereupon the temperature measured on the outer surface of the sandwich structure sheet immediately after the furnace is 60-80° C., depending on the thickness and composition of the sandwich structure sheet and the exact position of the measuring device. At the target temperature, the sandwich structure sheet passes between a pair of press rolls, which presses air out of its material interfaces. The lamination furnace with its press rolls is also called an air discharge conveyor, and the aim in using it is to discharge air from between the material layers and to stick the layers together into a tight sandwich structure sheet. No air should be allowed to absorb back between the material layers after the lamination furnace treatment. Usually, successful lamination is ensured by an autoclaving process following the lamination furnace treatment, which aims to dissolve the remaining air evenly in the plastic layer.

The press roll pair removes air from the moving sandwich structure sheet by compressing it, whereupon the air in the material interfaces inside the sandwich structure becomes highly overpressurised and tries to discharge from the sandwich structure sheet. The air tries to discharge in a direction opposite to the movement of the sandwich structure sheet in which the compression by the press roll pair and movement guide it. Thus, the air to be removed accumulates on the internal interfaces of the sandwich structure sheet, increasingly at its rear end. The ability of the rear edge of the sandwich structure sheet to discharge air from the interfaces is in fact particularly important although some of the air is also discharged through the side edges of the sandwich structure sheet. A common quality problem in producing laminated glass is the formation of visible air bubbles in the sandwich structure sheet. They may be discovered immediately after the lamination furnace treatment or only after autoclaving. The reason for the formation of air bubbles is unsuccessful discharge of air in the above-mentioned lamination furnace treatment. By far the most common place where the air bubbles appear is the rear edge area of the sandwich structure sheet. The problem is more common in wide than narrow sandwich structure sheets, with thinner than thicker plastic, when using tempered glass, with SentryGlas™ plastic rather than PVB and in the case of two plastic layers on top of each other. Two plastic layers on top of each other are generally used, for example, when the desired total thickness of the plastic is 1.52 mm and only the most common 0.76 mm thick plastic is available in stock. Thus, in order to obtain a thick laminating film layer, more than one plastic films should often be added between the glass sheets to obtain the required layer thickness, which in the lamination furnace easily results in the premature adhering together of the films at the rear end of the sandwich structure sheet, and further in the formation of air bubbles between the film layers. The air bubble problem is greater the larger and longer the glass sheet to be laminated. The longer the sheet, the greater the distance over which air should be pressed out. The width of the glass being laminated is also a relevant factor since the air discharges partly also through the sides of the sandwich structure sheet and not only through the rear. Overheating the sandwich structure sheet at the lamination stage also results in the same problem regarding the formation of air bubbles, because in that case the films melt and adhere to each other or to the glass prematurely and the air remaining between the layers cannot be discharged by compressing with the press rolls. The surface of a tempered glass sheet also brings an additional challenge to lamination. The surface of a tempered glass sheet is not completely smooth but slightly wavy, which makes the laminated glass more susceptible to the formation of air bubbles. Air pockets remain more easily between the wavy surface and the film, and it is not as easy to purge the air out.

There have been various earlier attempts to solve the problem.

In U.S. Pat. No. 8,097,107 B2, an attempt has been made to solve the problem by heating a sandwich structure sheet such that the temperature at its front end is higher than the temperature at its rear end, in order to avoid the premature sealing of the edges which hinders the discharge of air and humidity, which occurs if the sandwich structure sheet is heated across its entire length and width. The heating varying in the longitudinal direction of the sandwich structure sheet is carried out by varying the switching on time and output of the longitudinal radiation tube heating elements transverse to its movement such that the front end is heated to a higher temperature than the rear end.

EP 2431172 B1 discloses a method for manufacturing compound safety glass. In the method is used a heater box module for heating a sandwich structure sheet, comprising an upper heater box from which heat is discharged by means of an infrared emitter and hot air is discharged by an upper circulating-air system towards the glass being laminated.

In FI 100009 B is described a method and an apparatus for laminating glass sheets, wherein the sandwich structure to be laminated is preheated with radiation heat to 30° C.-45° C., after which first pressing between a pair of rolls is carried out. After this, the sandwich structure is heated by means of two-sided hot air blasting to a temperature of 60° C.-85° C., which is followed by pressing between a second pair of press rolls.

FI 118003 B describes a method and an apparatus for laminating glass panels, wherein the sandwich structure to be laminated is preheated with radiation heat, after which the sandwich structure is heated by means of a bilateral blast of hot air simultaneously with radiation heating.

However, none of the foregoing solutions solves the problem of preventing the formation of air bubbles in a satisfactory manner.

SUMMARY

One object of the disclosure is to provide a method and an apparatus for laminating glass sheets, by means of which the occurrence of air bubbles can be reduced, and the quality of laminated glass can thus be improved.

This object can be achieved by means of a method for laminating glass sheets, in which method at least one plastic film is disposed between glass sheets, the thus formed sandwich structure sheet is conveyed along a roller track to a heating furnace, wherein the sandwich structure sheet moving in the heating furnace is heated by means of two-sided hot air blasting, which is carried out by several successive blowing aperture sections, wherein the air jets discharging from the blowing apertures impact with the sandwich structure sheet, and the heated sandwich structure sheet is conveyed between the pair of press rolls. In the heating furnace, the hot air blasting of at least one blowing aperture section is cut off, reduced, or its impact with the sandwich structure sheet is prevented when the rear edge of the sandwich structure sheet approaches the blowing aperture section.

A further object of the disclosure is to provide an apparatus for laminating glass sheets with plastic film to form a sandwich structure sheet, the apparatus comprising a heating furnace, a pair of press rolls and means for establishing location data on the sandwich structure sheet, and the heating furnace is provided with a roller track, at least one blower, a heating resistor and an air distribution conduit, and above and below the roller track are several successive blowing boxes, wherein at least one blowing box is provided with closing means, by means of which its air blasting towards the sandwich structure sheet can be reduced or prevented when the rear edge of the sandwich structure sheet approaches the blowing box.

Preferred exemplary embodiments are disclosed herein.

DESCRIPTION OF THE FIGURES

The disclosure is described in greater detail in the following, with reference to the accompanying drawings.

DETAILED DESCRIPTION

Figure 1:
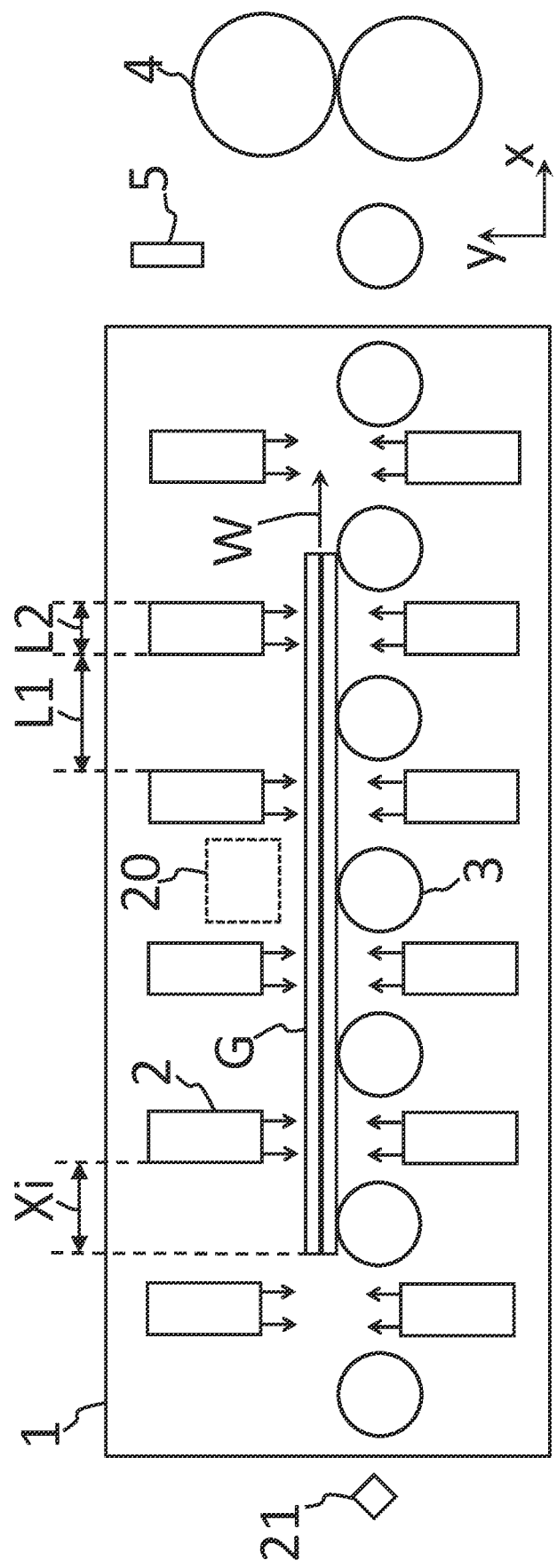
FIG. 1 shows a cross-section of an exemplary embodiment of the apparatus according to the disclosure, as seen from the side.
Figure 2:
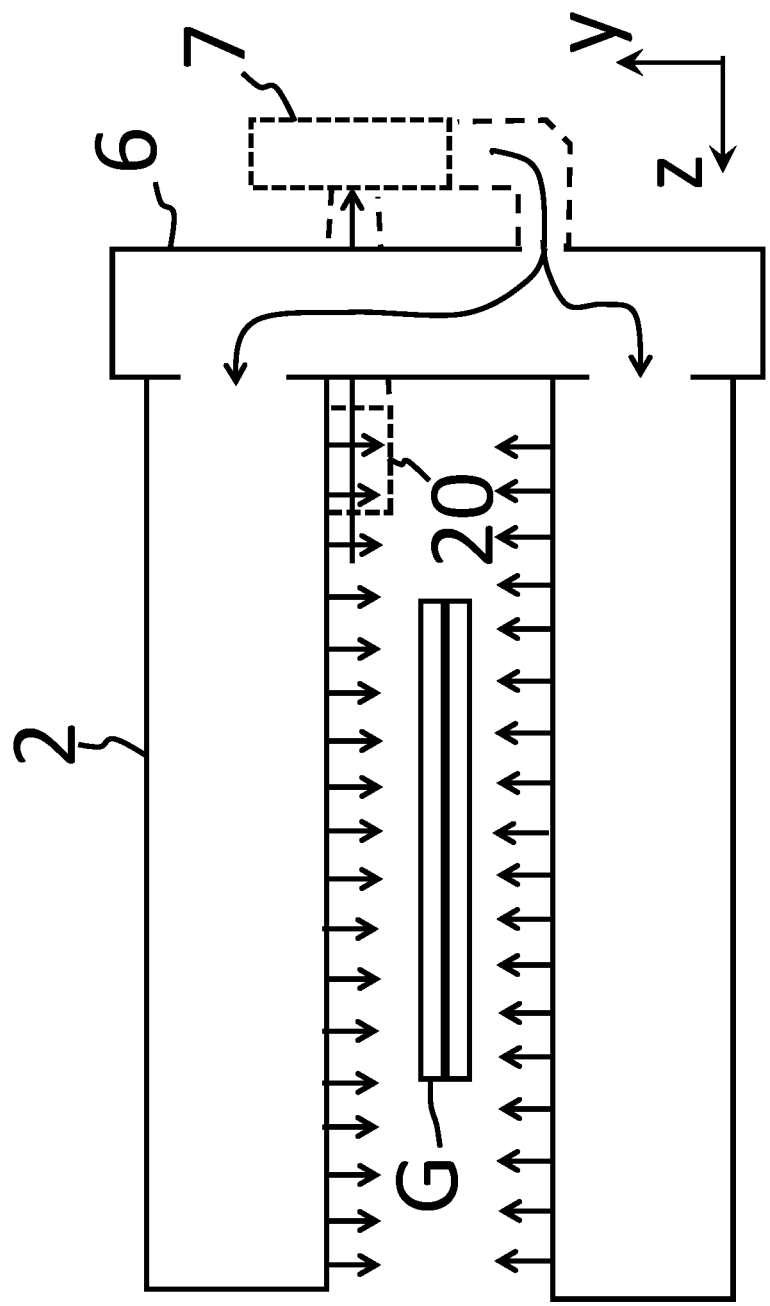
FIG. 2 shows a cross-section of an exemplary embodiment of the apparatus according to the disclosure, as seen from its end.
Figure 4:
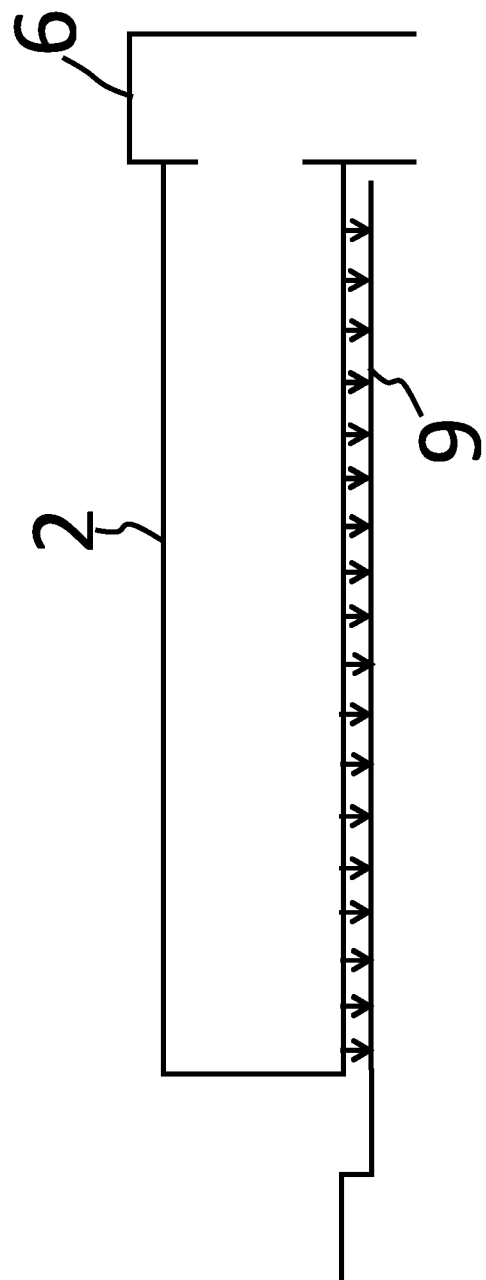
FIG. 4 shows the baffle plate solution of the blowing jets according to one exemplary embodiment of the disclosure.

FIG. 1 shows a cross-section of an exemplary embodiment of the apparatus according to the disclosure as seen from its side, that is, from direction z (not shown in FIG. 1, but understood to be orthogonal to both directions x and y). A lamination furnace 1 comprises heating means, which are convection blowing means. The convection blowing means comprise heating resistors 20, a blower, an air distribution conduit, and a blowing box 2. The wall of the blowing box 2 facing the sandwich structure sheet G comprises blowing apertures. There are blowing boxes 2 above and below the sandwich structure sheet. The blowing boxes 2 form several (at least two) successive blowing aperture sections in the furnace, in the direction of movement of the sandwich structure sheet, wherein the air jets discharging from the blowing apertures impact with the sandwich structure sheet. In FIG. 1, the successive blowing aperture sections are comprised of successive blowing boxes 2. Separate successive blowing aperture sections can be formed in the furnace also in different ways, for example, by means of partition walls in the direction of movement of the sandwich structure sheet in longer blowing boxes. The lamination furnace comprises a roller track having several rollers 3 which convey the sandwich structure sheet G through the furnace 1 during the heating process at speed of travel W. The roller gap, that is, the distance between the centres of the roller axes of the rollers 3, is typically 100-300 mm in the roller track. The blowing boxes 2 are oblong and their length with the blowing apertures covers the loading width of the whole furnace. The loading width is usually between 1-3.5 m. The blowing boxes are, for example, round or square in cross-section, as shown in FIG. 1. The length of the blowing boxes in the direction of movement of the sandwich structure sheet (direction x) is L2, which is preferably 50-150 mm. The distance L1 between the blowing boxes is preferably 50-200 mm. Above and below one roller gap is preferably one blowing box 2, as shown for example in FIG. 1. In FIGS. 1, 2 and 4, the arrows pointing out from the blowing boxes 2 depict the air jets discharging from the blowing apertures. The direction of the air jets is preferably perpendicular to, or at most at a 20-degree angle to the perpendicular of, the surface of the sandwich structure sheet.

The blowing boxes, the rows of blowing apertures in them, or at least the separate blowing aperture section formed by them, are preferably essentially parallel with the rollers, that is, essentially transverse to the direction of movement of the sandwich structure sheet. In the foregoing, "essentially" means a maximum angular difference of 15 degrees with respect to the direction of the rollers. The diameter of the blowing apertures is 4-20 mm, and preferably 5-15 mm. The blowing apertures may also be other than round in shape, for example, oblong gaps. The blowing distance from the blowing aperture to the surface of the sandwich structure sheet is 30-200 mm, and preferably 50-150 mm.

Device 5 is a device configured for measuring the glass surface temperature after heating in lamination oven. It can include a pyrometer, thermal camera or thermal scanner. In the present disclosure, the device 5 can be used to measure the cutting of air blasting effects on temperature of the glass rear end, e.g., to reduce the risk of rear end temperatures that are too low.

The heating resistors 20 (see FIG. 2) are preferably electrical resistor packs mounted in the air distribution conduit, on the suction side of the blower, through which the air drawn in by the blower flows. They may also be separate oblong resistor tubes which radiate directly towards the upper and lower surfaces of the sandwich structure sheet. The heating resistors may also be other types of air heating devices.

The apparatus according to the disclosure also comprises a positioning device 21 as means for establishing location data on the sandwich structure sheet. On the basis of the information provided by the positioning device, a computer determines the location of the rear edge of the sandwich structure with respect to the blowing box, in order that the blasting can be cut off or reduced as planned. The positioning device can include, for example, a photocell, the servomotor of the roller track or a pulse sensor connected to the actuators of the roller track. The input data needed to solve momentary location of the rear edge of the sandwich structure before it enters in a laminating furnace can be given to a computer by a photocell, for instance, and glass moving speed from its set value, for instance. Then, the location of the rear edge of the sandwich structure in the lamination furnace with respect to the each blowing box can be solved. If the moving speed changes during heating, then the servomotor of the roller track or a pulse sensor connected to the actuators of the roller track, for instance, offers input data to computer to solve the location of the rear edge of the sandwich structure in the lamination furnace with respect to the each blowing box.

FIG. 2 shows the cross-section of a lamination furnace according to one embodiment of the disclosure, as seen from its end. The rollers are not shown in FIG. 2 because the cross-section is taken at the blowing boxes. The air discharged from the blowing boxes 2 heats the sandwich structure sheet G on both of its surfaces as it travels through the furnace. The blower 7 draws air from the furnace and blows it through the air distribution conduit 6 into the blowing boxes 2, through the blowing apertures in which the air discharges as jets towards the sandwich structure sheet G.

The control temperature of the furnace preferably ranges between 150-250° C., which is measured from the air distribution conduit with a thermoelement. The warm air jets discharging from the blowing apertures impact with the surfaces of the sandwich structure sheet, from which the heat is conducted deeper into the sandwich structure. Typically, the aim of the heating is to heat the plastic films in the sandwich structure to a bonding temperature of 55-75° C. The thus heated sandwich structure sheet leaves the furnace and almost immediately passes through the pair of press rolls 4 following the furnace. Pressing with the press roll pair forces the air on the interfaces of the layers of the sandwich structure sheet to discharge from the sandwich structure sheet.

In the heating furnace according to the disclosure, the hot air blasting of at least one blowing aperture row is cut off or reduced, or its impact with the sandwich structure sheet is prevented when the rear edge of the sandwich structure sheet approaches the line of impact of the air jets of the row of blowing apertures. At the moment when the hot air blasting is cut off or reduced, the distance parallel to the surface of the sandwich structure from the blowing box, the row of blowing apertures or the point of impact of the blowing aperture row with the surface of the glass is Xi in FIG. 1. The cutting off or reduction of the blasting continues over the remainder of the length of the sandwich structure, up to the rear edge of the glass. This reduces the heating of the rear edge area of the sandwich structure sheet in the length section Xi beginning from the rear end of the glass, that is, its temperature at the pair of press rolls. The aim of reducing the heating of the rear edge area of the sandwich structure sheet is to enhance the discharge of air at the pair of press rolls, thus alleviating or even eliminating the above-described air bubble problem of laminated glass. The discharge of air is enhanced because there will be more discharge routes for the air when the film is colder and less tightly adhered to the glass or another film. The temperature of the film should be sufficient even on the rear edge of the sandwich structure sheet in the pair of press rolls in order that the material layers will adhere to each other sufficiently tightly once the air has been removed. The method aims to reduce the temperature of the plastic film in the rear edge area of the sandwich structure sheet by at least 1° C. and preferably by at least 3° C. at the end of heating with respect to heating without applying the method. The aimed temperature reduction is dependent on the level of overheating of the rear of the sandwich structure. It is important that the bonding temperature of the plastic film being pressed by the press roll pair is sufficiently high. For example, the bonding temperature of PVB film being pressed by a pair of press rolls should be at least approximately 60° C. even at the rear of the sandwich structure sheet, which is a suitable minimum temperature also for many other film materials.

In general, exemplary embodiments in accordance with the present disclosure aim to reduce the heating of the sandwich structure sheet in its rearmost half. The aim in reducing the heating of the rear edge of the sandwich structure sheet is particularly to reduce the temperature of last less than 150 mm section of the rear edge of the sandwich structure sheet, which tends to overheat with respect to the section further away from the rear edge. Excessive overheating can result in the films adhering together prematurely, which can prevent the discharge of air from between the glass and the film, or two films, at the pressing stage when the sandwich structure sheet travels through the pair of press rolls. One reason for the above-mentioned overheating is an additional heat transfer area the size of the thickness of the sandwich structure on the edges of the sandwich structure. The most common sandwich structure sheet thicknesses range between 6-25 mm, but the thickness may be as much as 150 mm. The effect of the overheating described above extends the further from the rear end the thicker the sandwich structure sheet is. The effect can be noted to extend strongly especially to a longitudinal section of the size of the thickness of the sandwich structure from the rear edge, and at least somewhat to a section which is 2-3 times longer. Right on the rear edge of the sandwich structure, the temperature of the plastic film may be as much as 20-30° C. higher than closer to the centre of the sandwich structure sheet, where the temperature difference is rapidly reduced when moving from the rear edge closer to the centre of the length of the glass. By means of the disclosure, this overheating of the rear edge area can be reduced and thus an attempt can be made to prevent or reduce the premature sealing of the edge at the rear end of the sandwich structure sheet, from which the air, and especially the humidity, inside the sandwich structure tends to discharge during pressing with the pair of press rolls.

Cutting off or reducing heating can be carried out in several ways.

The lamination furnace comprises means for preventing the overheating of the sandwich structure sheet. According to one preferred embodiment, the means for preventing overheating is a device, by means of which airflow to the blowing apertures of the blowing box can be prevented. According to another preferred embodiment, the means for preventing the overheating of the sandwich structure sheet is a device, by means of which the impacting of air jets discharged from the blowing apertures of the blowing box towards the sandwich structure with the sandwich structure sheet can be prevented.

Figure 3:
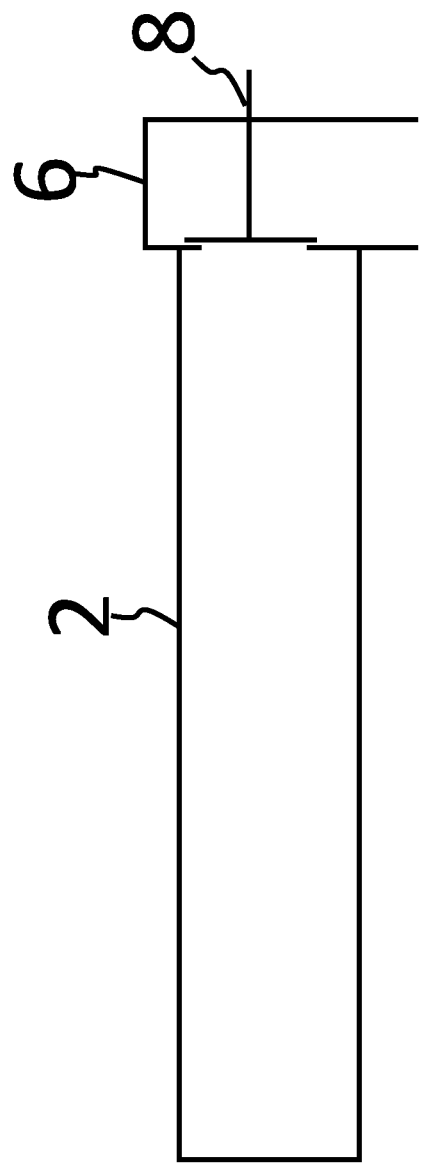
FIG. 3 shows the shutter of a blowing box according to one exemplary embodiment of the disclosure.

FIG. 3 shows a solution according to one embodiment, wherein the airflow to the blowing box is prevented by means of a shutter 8. In this way, the feed opening of the blowing box can be blocked when it is desirable to prevent the blast from the blowing box towards the sandwich structure. By partial blocking of the feed opening of the blowing box, the air jets discharged from the blowing box towards the sandwich structure can be reduced. The shutter 8 is preferably a flap valve, wherein the turning of the flap throttles the feed opening of the blowing box.

FIG. 4 shows another embodiment, wherein a baffle plate 9, functioning as a closing means, is moved in front of the air jets, thus preventing the impacting of the air jets discharged from the blowing apertures of the blowing boxes with the sandwich structure. The baffle may also be partial, whereupon the blasting impacting with the sandwich structure is reduced.

Figure 5:
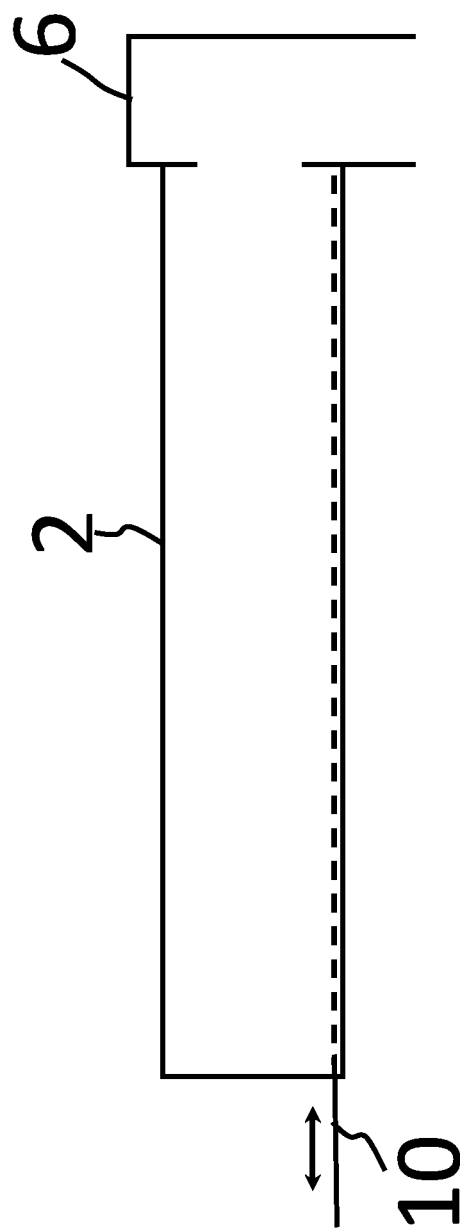
FIG. 5 shows the closing of the blowing apertures of a blowing box with a perforated plate according to one exemplary embodiment of the disclosure.

FIG. 5 shows another embodiment comprising a perforated plate 10 with similar or larger holes than the blowing apertures in the blowing box. When preventing the blast is desirable, the perforated plate is moved in direction z (indicated by the double arrow in FIG. 5), in which case the hole in the perforated plate is no longer at the blowing aperture of the blowing box, but blocks it, thus preventing the blast from the blowing box. Similarly, the blasting can also only be reduced when the unperforated part of the perforated plate blocks the blowing aperture only partly.

The hot air blasting can be cut off or reduced also in other ways than those described above. From the point of view of the disclosure, it is preferred that the actuator cutting off or reducing the hot air blasting is sufficiently quick. The actuator preferably cuts off or reduces the hot air blasting as desired in less than one second, and more preferably in less than 0.5 seconds. The actuator is preferably electric or pneumatic. The upper and lower blowing boxes or their shutters 8, baffle plates 9 or perforated plates 10 are preferably connected to each other mechanically such that blasting on the upper and lower surface of the sandwich structure sheet can be cut off simultaneously by one actuator. This can be done with one shutter 8 if the upper and lower blowing boxes have the same feed opening.

In one preferred solution of the disclosure, in the heating furnace, the hot air blasting of at least one blowing aperture row is cut off, reduced, or its impact with the sandwich structure sheet is prevented at the latest when the rear edge of the sandwich structure sheet approaches at a distance of at most 150 mm (i.e. $X_i$ is at most 150 mm) or at the distance of the spacing L1 of the blowing boxes, the blowing aperture section or the line of impact of the air jets of the blowing aperture row on the surface of the sandwich structure sheet. According to another preferred embodiment, the hot air blasting directed at the sandwich structure sheet is cut off, reduced, or its impact with the sandwich structure sheet is prevented when the rear edge of the sandwich structure sheet approaches the blowing aperture section or the line of impact of the air jets of the blowing aperture row on the surface of the sandwich structure sheet at a maximum distance of half the length of a sandwich structure sheet. According to yet another preferred embodiment, the hot air blasting directed at the sandwich structure sheet is cut off, reduced, or its impact with the sandwich structure sheet is prevented when the rear edge of the sandwich structure sheet approaches the blowing aperture section at a maximum distance corresponding to three times the thickness of the sandwich structure sheet or 450 mm.

In the heating furnace, the hot air blasting of at least one blowing aperture section above and below a sandwich structure sheet is cut off, reduced, or its impact with the sandwich structure sheet is prevented when the rear edge of the sandwich structure sheet approaches the blowing aperture section as described above. At least one blowing box above and below the sandwich structure sheet is then provided with closing means. In this way is ensured that there is no significant temperature difference either between the upper and lower surfaces of the sandwich structure sheet in the rear edge area of the sandwich structure sheet during press roll pressing. Cutting off, reducing, or preventing the impacting of hot air blasting described above is preferably carried out simultaneously on both sides of the sandwich structure sheet. The blowing boxes provided with closing means are in that case at the same roller gap point of the heating furnace.

According to one preferred embodiment, the heating furnace comprises several blowing aperture sections (e.g. blowing boxes), the hot air blasting of at least two of which is cut off, reduced, or its impact with the sandwich structure sheet is prevented when the rear edge of the sandwich structure sheet approaches the blowing aperture section. According to an even more preferred embodiment, the heating furnace comprises at least eight successive blowing aperture sections, in at least half the number of which the hot air blasting is cut off, reduced, or its impact with the sandwich structure sheet is prevented when the rear edge of the sandwich structure sheet approaches the blowing aperture section. In this embodiment, at least half of the blowing boxes are provided with closing means, by means of which the air blasting of a blowing box towards the sandwich structure sheet can be reduced or prevented. According to one preferred embodiment, the length of the blowing aperture section of a blowing box provided with closing means is at most 200 mm in the direction of movement of the sandwich structure sheet or one roller gap.

By means of the method, the heating of the rear end of the sandwich structure sheet can preferably be reduced in more than one step. The impacting of the hot air blasting of one blowing section with the sandwich structure sheet is then cut off (or reduced) when the rear edge of the sandwich structure sheet approaches at distance $X_i$ from the blowing aperture section, and the impacting of the hot air blasting of a second blowing section with the sandwich structure sheet is cut off when the rear edge approaches at distance $X_i$—STEP from another blowing section. Thus, in the heating furnace, the hot air blasting of at least two blowing aperture sections is cut off, reduced, or its impact with the sandwich structure sheet is prevented when the rear edge of the sandwich structure sheet approaches the blowing aperture sections at various distances. The difference in distance STEP is preferably at least 1 cm. A change in heating at the rear end of the sandwich structure sheet with more than the above-mentioned two steps is also possible with this method.

When approaching the rear edge of the sandwich structure sheet, the increasing reduction in the blasting of the blowing aperture section can also be carried out, for example, by preventing airflow to the blowing aperture section with a shutter slower than usual, for example, within the time ($X_i$—FULL)/W, where FULL is the length from the rear end of the glass, where maximum reduction is desirable. In this way and in the manner described above, the temperature can be reduced more right at the rear end rather than slightly closer to the centre of the sandwich structure sheet, that is, the temperature at the rear end of the sandwich structure sheet can be controlled even more precisely.

In the heating furnace according to the disclosure, the blast pressure of the air jets, that is, the difference in air pressure between the blowing box and the heating furnace is preferably 100-1000 Pa, the temperature of the air is preferably 150-250° C. and the rate of travel of the sandwich structure is preferably 0.5-6 m/min.

By using the method and furnace according to the disclosure, the formation of air bubbles can essentially be prevented compared to the current methods and the furnaces on the market.

A laminating film can refer to the plastic film used in the above description, but can also cover other possible film materials in addition to plastic, as deemed suitable by a person of ordinary skill in the art.

It will be appreciated by those skilled in the art that the disclosure herein can be embodied in other specific forms without departing from the spirit or essential characteristics thereof. The presently-disclosed embodiments are therefore considered in all respects to be exemplary and not restrictive. The scope of the invention is indicated by the appended claims rather than the foregoing description and all changes that come within the meaning and range and equivalence thereof are intended to be embraced therein.

The invention claimed is:

1. An apparatus for laminating glass sheets to form a sandwich structure sheet, the apparatus comprising:
   a heating furnace;
   a pair of press rolls; and
   means for establishing location data on the sandwich structure sheet,
   wherein the heating furnace is provided with a roller track, at least one blower, a heating resistor and an air distribution conduit,
   wherein above and below the roller track are a plurality of successive blowing boxes, and
   wherein at least one of the blowing boxes is provided with closing means configured to reduce or prevent air ejected therefrom from blasting towards the sandwich structure sheet when a rear edge of the sandwich structure sheet approaches the at least one blowing box.

2. An apparatus according to claim 1, wherein at least two blowing boxes, including one above and another below the sandwich structure sheet, are each provided with the closing means configured to reduce or prevent air ejected therefrom from blasting towards the sandwich structure sheet when the rear edge of the sandwich structure sheet approaches the at least two blowing boxes.

3. An apparatus according to claim 1, wherein the blowing boxes include at least eight successive blowing boxes, at least half of which are provided with the closing means configured to reduce or prevent air ejected therefrom from blasting towards the sandwich structure sheet.

4. An apparatus according to claim 1, wherein a feed opening of the at least one blowing box has a movable shutter configured to reduce or prevent airflow into the at least one blowing box.

5. An apparatus according to claim 1, wherein the closing means is a movable baffle plate.

6. An apparatus according to claim 1, wherein inside the at least one blowing box is a movable perforated plate configured to reduce or prevent discharge of air jets discharging from the blowing apertures of the at least one blowing box.

7. An apparatus according to claim 1, wherein a length of a blowing aperture section of the at least one blowing box provided with the closing means is less than or equal to 200 mm or less than or equal to the distance between the centers of the roller axes for adjacent rollers on the roller track in a direction of conveyance of the sandwich structure sheet.

* * * * *